United States Patent
Dunchock

Patent Number: 5,845,369
Date of Patent: Dec. 8, 1998

[54] EYE GLASS HOLDER

[76] Inventor: Richard Stephen Dunchock, 254 Driftwood Rd., Corona Del Mar, Calif. 92625

[21] Appl. No.: 734,976

[22] Filed: Oct. 22, 1996

[51] Int. Cl.$^6$ .................................................. A44B 21/00
[52] U.S. Cl. ................................... 24/3.3; 24/13; 24/103; 24/108; 248/902
[58] Field of Search .................................... 24/3.3, 13, 12, 24/103, 104, 108, 358; 206/5; 351/155, 112, 158, 41; 248/902, 309.1, 315; 63/12, 13, 14.3

[56] References Cited

U.S. PATENT DOCUMENTS

| 178,726 | 6/1876 | Brown | 24/108 |
|---|---|---|---|
| 561,893 | 6/1896 | Jansky | 63/13 |
| 3,956,795 | 5/1976 | Kosakai | 24/3.3 |
| 4,458,384 | 7/1984 | Arnold | 24/3.3 |
| 4,894,887 | 1/1990 | Ward, II | 24/3.3 |
| 5,000,410 | 3/1991 | Beavers | 24/3.3 X |
| 5,033,612 | 7/1991 | Bivins | 24/3.3 X |
| 5,046,696 | 9/1991 | Lee | 248/902 X |
| 5,319,838 | 6/1994 | Eppenauer | 24/3.3 |
| 5,467,510 | 11/1995 | Hartzell | 24/104 X |
| 5,537,841 | 7/1996 | Bradvica | 63/12 |

FOREIGN PATENT DOCUMENTS

| 188482 | 11/1922 | United Kingdom | 24/108 |
|---|---|---|---|

*Primary Examiner*—Peter M. Cuomo
*Assistant Examiner*—Honh V. Tran
*Attorney, Agent, or Firm*—Stetina Brunda Garred & Brucker

[57] ABSTRACT

An eye glass holder is provided which is attachable to an article of fabric, for supporting and securing a pair of eye glasses. The eye glass holder comprises a pin assembly engageable to the fabric. The pin assembly includes a substantially planar member having an outer eye glass frame striking surface and an inner fabric abutting surface. The pin assembly further includes a ring member extending from the outer striking surface and defining an eye glass frame receiving aperture therebetween. The pin assembly further includes a pin extending normally form the inner fabric abutting surface, through the abutting fabric. A clutch assembly is provided which is engageable to the pin. The clutch assembly includes a clutch for receiving and engaging the pin, and the clutch facing secured to the clutch and extending circumferentially thereabout.

13 Claims, 2 Drawing Sheets

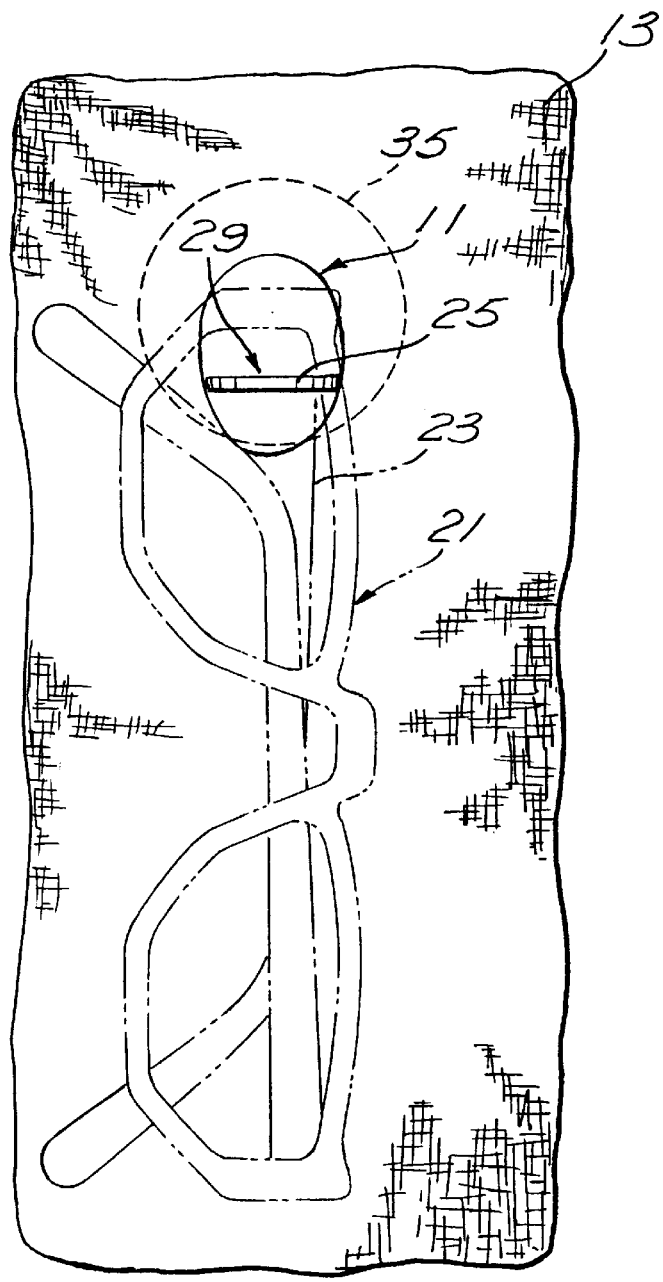
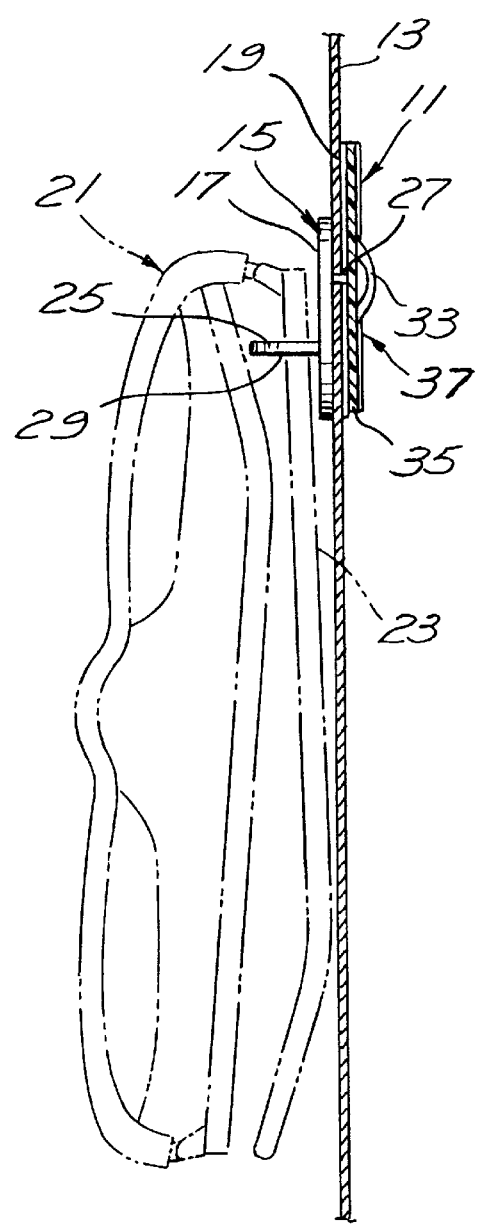

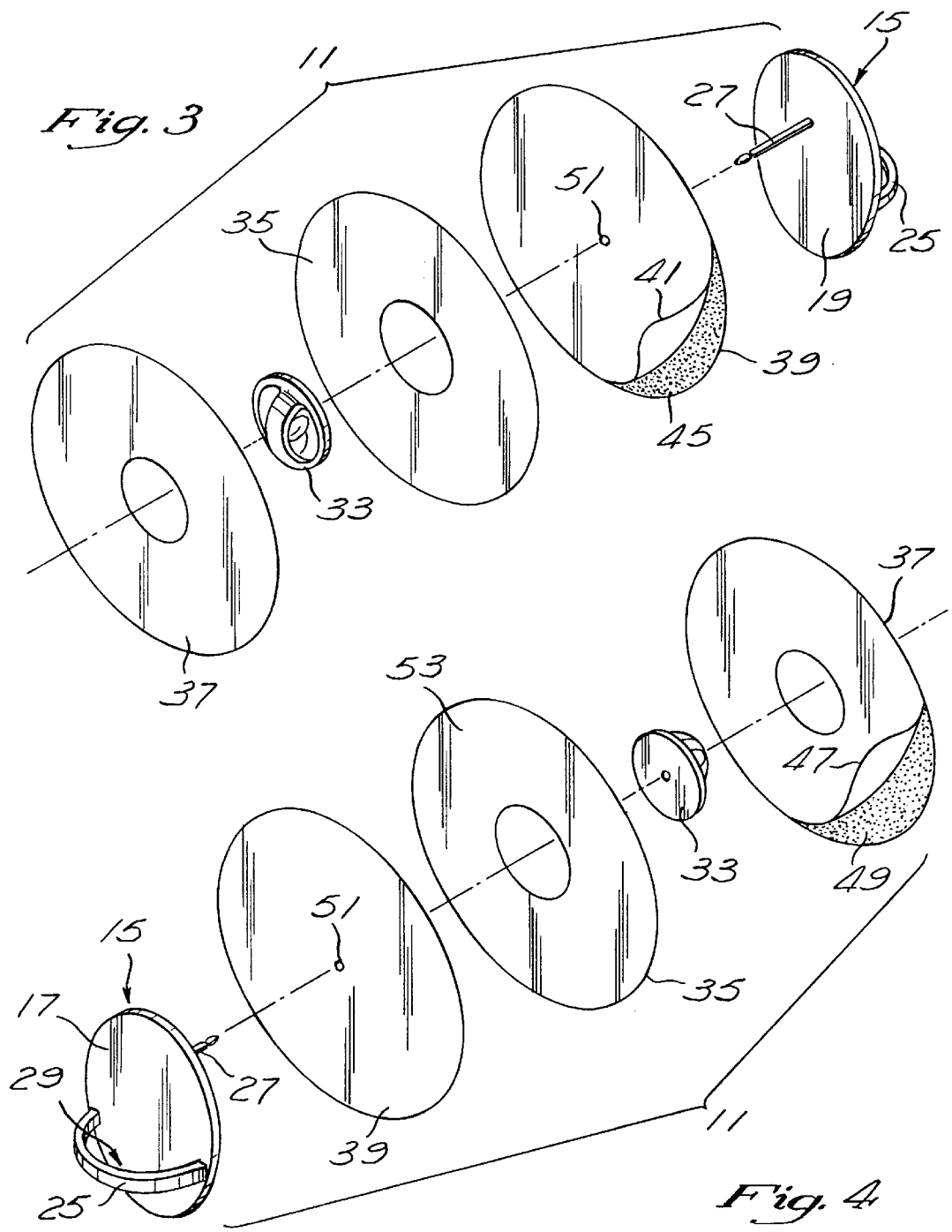

EYE GLASS HOLDER

FIELD OF THE INVENTION

The present invention relates to eye glass holders and, in particular, eye glass holders adapted to secure to the article of clothing of a user.

BACKGROUND OF THE INVENTION

Millions of people wear eye glasses everyday. However, many of them remove their eye glasses during the course of the day for various reasons. In some cases, the eye glasses are needed only for reading. In other cases, the eye glasses are needed only for seeing objects at a distance. In other cases, individuals simply remove their eye glasses to perform other activities or simply to give their eyes a rest. In each case, the user requires a place to hold or store the eye glasses when they are not used.

Eye glass cases are commonly available, as are chains or strings which move about the head or neck of a user and hold the eye glasses when they are removed from the user's head. As chains are fully functional to store or hold eye glasses when not in use, they frequently suffer from practical or aesthetic shortcomings that limit their use. Individuals dressed in casual clothes frequently, do not choose to carry eye glass cases, and may, for aesthetic reasons, prefer not to use eye glass chains. Various improvisations may be made to hold and support eye glasses when not in use, though they frequently suffer from an inability to secure the eye glasses, or are aesthetically desirable to many users.

The present invention addresses these and other deficiencies associated with contemporary eye glass holders. The present invention not only provides a device for securing eye glasses against dislodgement by an active user, but also provides a more aesthetically pleasing construction that can appear as an ornament pin. Moreover, when in use, the construction of the present invention allows the eye glass holder to serve its intended function, without detracting from the appearance of the fabric to which it is attached. More specifically, the present invention is directed to an eye glass holder which, when in use, distributes the load of the eye glasses over a broader area of the fabric to avoid or mitigate an unsightly stretching or pulling of the fabric about the eye glass holder.

These and other advantages of the invention are described in more detail below in conjunction with the presently preferred embodiment of the invention.

SUMMARY OF THE INVENTION

An eye glass holder is disclosed which is attachable to an article of fabric, for supporting and securing a pair of eye glasses. The eye glass holder comprises a pin assembly engageable to the fabric. The pin assembly includes a substantially planar member having an outer eye glass frame striking surface and an inner fabric abutting surface. The pin assembly further includes a ring member extending from the outer striking surface and defining an eye glass frame receiving aperture therebetween. The pin assembly further includes a pin extending normally form the inner fabric abutting surface, through the abutting fabric. A clutch assembly is provided which is engageable to the pin. The clutch assembly includes a clutch for receiving and engaging the pin, and the clutch facing secured to the clutch and extending circumferentially thereabout.

The clutch facing is designed to be resiliently deformable against the abutting fabric, upon engagement of the eye glasses to the ring member. The resilient deformation of the clutch facing functions to distribute a load attributable to the weight of the eye glasses to the fabric about the clutch facing. The clutch facing thereby resiliently opposes deformation of the adjacent fabric upon engagement of the eye glasses to the ring member.

The clutch facing is preferably formed as a substantially planar circular member, fabricated of resilient plastic material. The clutch and clutch facing may be formed as substantially circular members, wherein the clutch has a diameter of approximately one-third the diameter of the clutch facing. In the presently preferred embodiment the clutch facing is formed to have a diameter of approximately 1½ inches, while the clutch is formed to have a diameter of approximately ½ inches.

The clutch facing may be formed to have a thickness of between 0.005–0.010 inches. In the presently preferred embodiment the clutch facing is formed to be approximately 0.005 inches thick.

The eye glass frame receiving aperture is preferably formed to be approximately 3/16 inch wide, and 1.8 inch deep, or less.

BRIEF DESCRIPTION OF THE DRAWINGS

FIG. 1 is a front view showing the invention supporting eye glasses on the clothing of a user;

FIG. 2, is a side view of the construction shown in FIG. 1;

FIG. 3 is an exploded rear view of the invention; and

FIG. 4 is an exploded front view of the invention.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth functions and construction of the invention in connection with the illustrated embodiment. It is to be understood, however, that the same or equivalent functions may be accomplished by different embodiments that are also intended to be accomplished within the spirit and scope of the invention.

FIG. 1 generally illustrates the arrangement of a pin assembly 11 disposed upon a fabric 13. The pin assembly 11 supports eye glasses 21 whereby eye glass temple 23 extends into an aperture 29 defined by ring member 25. The pin assembly 11 further includes a clutch facing 35, described in more detail below, disposed on the opposing side of fabric 13. The clutch facing 35 is resiliently deformable against the fabric, upon engagement of the eye glasses to ring member 25, to distribute the weight of the eye glasses to the fabric about the clutch facing, thereby opposing deformation of the fabric when the eye glasses are located within the ring member 25.

FIG. 2 provides a further illustration of the pin assembly 11. As shown therein the pin assembly 11 includes clutch 33 and clutch facing 35. The clutch 33 operates to receive and engage pin 27, extending through fabric 13. The clutch 33 also functions to urge clutch facing 35 against the fabric 13.

FIGS. 3 and 4 provide exploded views of the pin assembly 11, taken from the front and rear perspectives.

As shown at FIGS. 3 and 4 the pin assembly 11 includes a substantially planar member 15 having an outer, eye glass frame striking surface 17, and an inner fabric abutting surface 19. The pin 27 extends from the inner fabric abutting surface 19, through the fabric and is engaged by clutch 33.

Planar circular members 37, 39 facilitate the engagement of the clutch facing 35 to the clutch 33. Member 39 is provided with a removable layer 41 which exposes an adhesive coating 45 that is engageable to clutch facing 35. Similarly, member 37 is provided with a removable layer 47 which exposes adhesive layer 49. The adhesive layer 49 facilitates the engagement of clutch 33 to clutch facing 35.

Member 39 is further provided with a pin hole aperture 51 to facilitate alignment of the clutch facing 35 and clutch 33.

As will be apparent to those of ordinary skill in the art, the planar member 15, clutch 33 and clutch facing 35 cooperate to secure the pin assembly in close abutting engagement to the fabric 13. The clutch facing 35 is preferably formed of resilient plastic material that is sufficiently stiff to resiliently support to provide resilient lateral support to the fabric upon engagement of the eye glasses to the ring member 25. However, the clutch facing is also sufficiently deformable to resiliently distribute the load of the eye glasses to the fabric about the surface area 53 of the clutch facing 35. Because of the size of the clutch facing, the load distribution mitigates stretching or pulling of the fabric about the pin assembly 11.

In the presently preferred embodiment the pin assembly is constructed such that the clutch facing has a diameter of approximately three times the diameter of the clutch. In the presently preferred embodiment the clutch facing has a diameter of approximately 1 ½ inches, while the clutch has a diameter of approximately ½ inch.

As presently determined, the clutch facing is preferably formed to be between 0.005–0.010 inches thick. In the presently preferred embodiment the clutch facing is formed to be approximately 0.005 inches thick.

The ring member 25 is preferably constructed to define an eye glass frame receiving aperture of approximately 3/16 inch thick. The ring member itself is preferably constructed to be approximately ⅛ inch thick, or less.

As will be apparent to those of ordinary skill in the art, various modifications or enhancements of the invention may be implemented without departing from the broader spirit and scope of the invention as described herein.

What is claimed is:

1. An eye glass holder attachable to an article of fabric for supporting and securing eye glasses, the eye glass holder comprising:

a pin assembly engageable to the fabric, the pin assembly including a substantially planar member having an outer, eye glass frame striking surface and an inner fabric abutting surface;

the pin assembly further including a ring member extending from the outer striking surface and defining an eye glass frame receiving aperture therebetween;

said pin assembly further including a pin extending normally from the inner fabric abutting surface;

said pin assembly further including a clutch for receiving and engaging the pin, and a clutch facing secured to the clutch and extending circumferentially thereabout, said clutch facing being resiliently deformable against the fabric upon engagement of the eye glasses to the ring member.

2. The eye glass holder as recited in claim 1 wherein the clutch facing is resiliently deformable to distribute a load attributable to the weight of the eye glasses to the fabric about the clutch facing.

3. The eye glass holder as recited in claim 2 wherein the clutch facing is disposable adjacent the fabric to resiliently oppose deformation of the fabric upon engagement of eye glasses to the ring member.

4. The eye glass holder as recited in claim 3 wherein the clutch facing is formed of resilient plastic material.

5. The eye glass holder as recited in claim 4 wherein the clutch facing is formed as a substantially planar circular member.

6. The eye glass holder as recited in claim 5 wherein the clutch facing has a diameter of approximately one and one-half inches.

7. The eye glass holder as recited in claim 5 wherein the clutch is formed as a substantially circular member having a diameter approximately one-third of the diameter of the clutch facing.

8. The eye glass holder as recited in claim 7 wherein the clutch is formed to have a diameter of approximately one-half inches.

9. The eye glass holder as recited in claim 5 wherein the clutch facing is formed to be between 0.005–0.010 inches thick.

10. The eye glass holder as recited in claim 5 wherein the clutch facing is formed to be approximately 0.005 inches thick.

11. The eye glass holder as recited in claim 3 wherein the eye glass frame receiving aperture is approximately three-sixteenths of an inch wide.

12. The eye glass holder as recited in claim 3 wherein the ring member is approximately one-eighth inch thick.

13. The eye glass holder as recited in claim 3 wherein the ring member is less than one-eighth inch thick.

* * * * *